(12) United States Patent
Cannon et al.

(10) Patent No.: US 6,650,871 B1
(45) Date of Patent: Nov. 18, 2003

(54) CORDLESS RF RANGE EXTENSION FOR WIRELESS PICONETS

(75) Inventors: Joseph M. Cannon, Harleysville, PA (US); James A. Johanson, Macungie, PA (US); Philip D. Mooney, North Wales, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/418,996

(22) Filed: Oct. 14, 1999

(51) Int. Cl.[7] .............................. H04B 7/15; H04B 5/00; H04Q 7/20
(52) U.S. Cl. .................. 455/41.2; 455/11.1; 455/426.1; 455/462
(58) Field of Search .............................. 455/95, 151.2, 455/403, 408, 420–422, 424–426, 434, 443–446, 451–459, 463, 465, 11.1, 22, 41.1–41.3, 517, 74, 462, 426.1

(56) References Cited

U.S. PATENT DOCUMENTS

| | | | | |
|---|---|---|---|---|
| 4,549,293 A | * | 10/1985 | Christian et al. | 370/95 |
| 5,363,426 A | * | 11/1994 | Nyhart | 379/57 |
| 5,406,615 A | * | 4/1995 | Miller, II et al. | 379/59 |
| 5,890,069 A | * | 3/1999 | Evans et al. | 455/462 |
| 6,026,297 A | * | 2/2000 | Haartsen | 455/426 |
| 6,069,588 A | * | 5/2000 | O'Neill, Jr. | 343/713 |
| 6,346,692 B1 | * | 2/2002 | Ubowski et al. | 219/702 |
| 6,366,622 B1 | * | 4/2002 | Brown et al. | 375/322 |

FOREIGN PATENT DOCUMENTS

EP     0 568 212 A2 *  3/1993  ............ H04Q/7/04

\* cited by examiner

Primary Examiner—William Trost
Assistant Examiner—Meless Zewdu
(74) Attorney, Agent, or Firm—William H. Bollman

(57) ABSTRACT

Cordless telephone technology provides a long range and highly sophisticated wireless extension between a plurality of wireless piconet networks. In one embodiment, base units of separate cordless telephones include respective piconet front ends (e.g., Bluetooth protocol bearing RF front ends) in addition to the otherwise conventional RF front end. The piconet-capable base units are placed and made members of separate piconet networks, but within conventional cordless telephone range of one another, e.g., within one mile of one another. To allow communications between piconet devices on the separate wireless piconet networks, the cordless telephone base units pass piconet content information (i.e., the messages passed by a piconet device on a first piconet network including a first cordless telephone base unit intended for receipt by another piconet device on a second piconet network serviced by the other cordless telephone base unit. In another embodiment, a base unit of a cordless telephone is made a member of a first wireless piconet network while its remote handset is made a member of a second wireless base unit, and piconet content information is passed from a device on one wireless piconet network to another device on the other wireless piconet network over the wireless cordless telephone (e.g., 900 MHz or 2.4 GHz range) channel established between the cordless telephone base unit and its remote handset.

29 Claims, 4 Drawing Sheets

LONG DISTANCE PICONET COMMUNICATIONS

LONG DISTANCE PICONET COMMUNICATIONS

CORDLESS RF RANGE EXTENSION FOR WIRELESS PICONETS

BACKGROUND OF THE INVENTION

1. Field of the Invention

This invention relates generally to piconet technologies such as Bluetooth or HomeRF. More particularly, it relates to techniques which greatly increase the wireless range of a piconet wireless network.

2. Background of Related Art

Wireless communications capability has developed for use between consumer electronic devices within a rather small area. This wireless communications capability uses a defined protocol to link the consumer electronic devices together in a wireless short-range network, called a piconet.

Wireless piconet technologies allow wireless networking between various communications enabled electronic devices, e.g., consumer electronic devices. For instance, wireless piconet technologies such as Bluetooth or HomeRF are currently envisioned for home use to allow communications between multiple consumer electronic devices within a rather small area, i.e., within 10 meters, with accommodations for larger area coverage up to 100 meters.

Bluetooth technology allows for the communication between various electronic devices using one universal short-range radio link at 2.4 GHz. This piconet system supports point-to-point communications by establishing piconets that use the same frequency hopping sequence. Up to eight devices can actively reside in a single piconet network.

If one piconet capable device desires to communicate with another piconet capable device which is not in the same piconet network, a multipoint connection can be made between separate piconet networks. Such a multipoint, or piconet-to-piconet connection, is termed a scatternet as shown in FIG. 4.

FIG. 4 is a block diagram of the implementation of a wireless scatternet to extend the range between two separate wireless piconet networks.

In particular, FIG. 4 shows the extension of coverage of a piconet system using a piconet scatternet connection between a piconet wireless device 2 in a first piconet network A and a second wireless device 3 in a second piconet network B.

Unfortunately, even the maximum area coverage of 100 meters is a substantial limitation eliminating the possibilities for use of piconet technologies over larger area applications. Moreover, even the 100 meter range limit of Bluetooth comes at the additional cost of an appropriate power amplifier.

The Bluetooth wireless network technology is a wireless piconet protocol conforming to an open specification for wireless communication of data and voice. The Bluetooth wireless network technology is based on a low-cost, short-range radio link. A piconet is a collection of devices connected via Bluetooth network technology. The piconet may include many types of processors, including the user's home computer.

Bluetooth technology provides for an optional power amp to increase wireless range from 10 meters up to 100 meters. Using conventional wired techniques (e.g., coaxial cable, twisted pair, fiber optics, etc.), the range of coverage of a piconet may be extending using routers and bridges. These "wired extension" techniques may work in some situations, but they generally negate some of the original advantages of the wireless piconet, namely, the mobility of wireless devices and the fact that there is no physical connection necessary.

There is a need for a technique which has the capability of extending the range of a wireless piconet without compromising the advantages provided by the wireless nature of the wireless piconet and without adding yet another type device to a household.

SUMMARY OF THE INVENTION

In accordance with the principles of the present invention, an RF cordless telephone range extender for a piconet comprises a cordless telephone including a cordless telephone RF front end and a piconet wireless network RF front end. The cordless telephone transmits piconet content information flowing on a piconet wireless network.

In a cordless telephone, the improvement in accordance with another aspect of the present invention comprises a piconet RF front end. Piconet content information received by the piconet RF front end relating to a first wireless piconet is transmitted over a cordless telephone RF front end of the cordless telephone to a second wireless piconet separate from the first wireless piconet.

A method of simulating scatternet functionality with a cordless telephone in accordance with yet another aspect of the present invention comprises implementing a piconet front end in a cordless telephone. Piconet network information is passed across a wireless channel established by the cordless telephone.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention relates to the use of cordless telephone technology (e.g., digital cordless telephones) and devices to provide a long range and highly sophisticated wireless extension between a plurality of wireless piconet networks.

In one embodiment, base units of separate cordless telephones include respective piconet front ends (e.g., Bluetooth protocol bearing RF front ends) in addition to the otherwise conventional RF front end. The piconet-capable base units are placed and made active members of separate piconet networks, but within conventional high power cordless telephone range of one another, e.g., within one mile of one another. To allow communications between piconet devices on the separate wireless piconet networks, the cordless telephone base units pass piconet content information, i.e., the messages passed by a piconet device on a first piconet network including a first cordless telephone base unit intended for receipt by another piconet device on a second piconet network serviced by the other cordless telephone base unit.

In another embodiment, a base unit of a cordless telephone is made a member of a first wireless piconet network while its remote handset is made an active member of a second wireless base unit, and piconet content information is passed from a device on one wireless piconet network to another device on the other wireless piconet network over the wireless, e.g., 900 MHz or 2.4 GHz range channel established between the cordless telephone base unit and its remote handset.

Thus, in accordance with the principles of the present invention, high-powered cordless telephones are utilized to pass data between two wireless piconet (e.g., Bluetooth enabled) devices.

Figure 1:
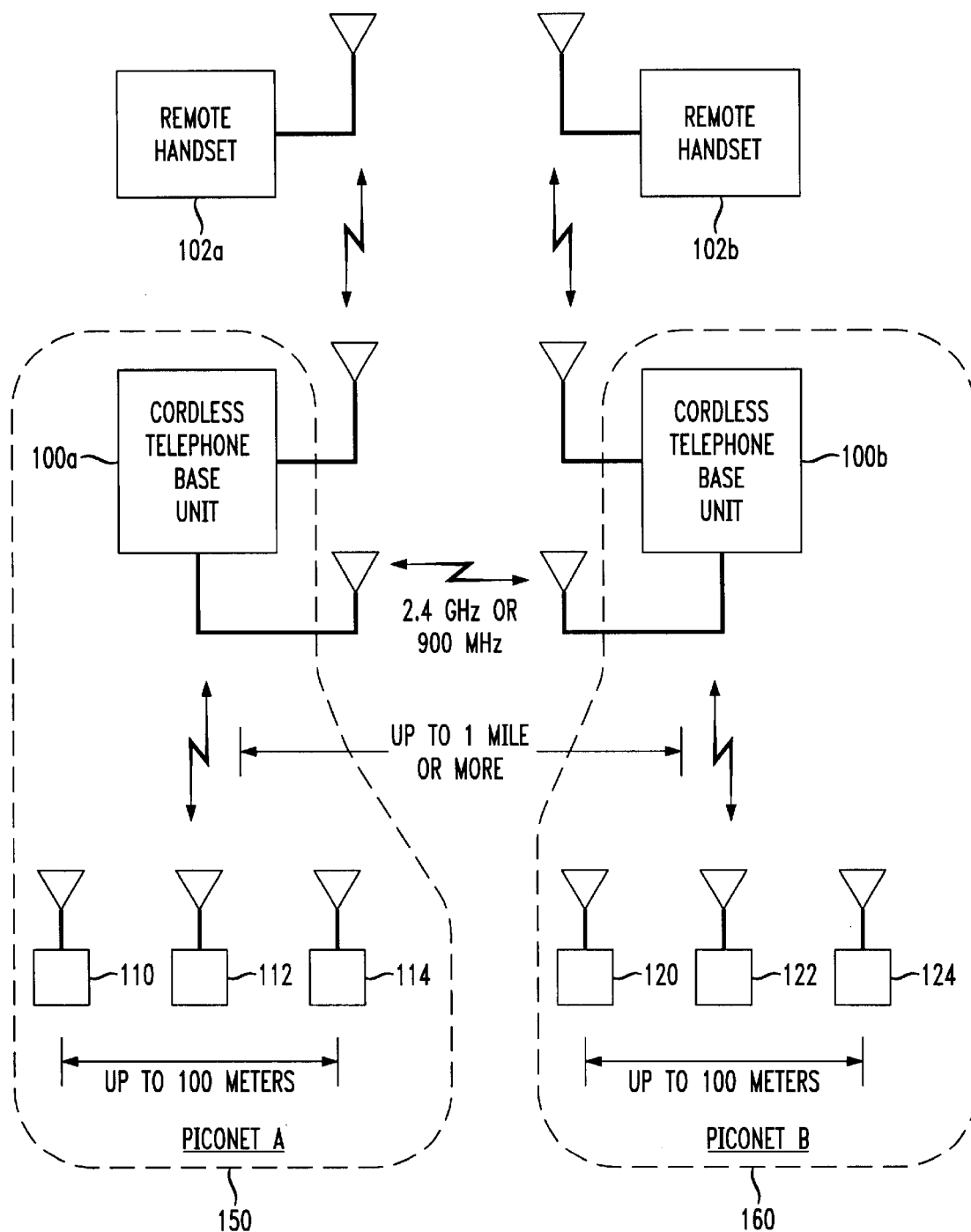
FIG. 1 shows a block diagram of the implementation of a cordless telephone base unit in each of two wireless piconet networks, and the communication of piconet content information from one piconet network to another over a cordless RF channel, e.g., 900 MHz or 2.4 GHz wireless channel between the two base units, in accordance with the principles of the present invention.

FIG. 1 shows a block diagram of the implementation of a cordless telephone base unit in each of two wireless piconet networks, and the communication of piconet content information from one piconet network to another over a cordless telephone wireless channel between the two base units, in accordance with the principles of the present invention.

In particular, in FIG. 1, a first wireless piconet 150 comprises one or more otherwise conventional piconet enabled (e.g., Bluetooth enabled) devices 110–114, as well as a piconet enabled (e.g., Bluetooth enabled) cordless telephone base unit 100a. The piconet devices 100a, 110, 112 and 114 all communicate with one another in accordance with known piconet techniques, e.g., using Bluetooth protocols. Similarly, a second wireless piconet 160 comprises one or more otherwise conventional piconet enabled devices 120–124, as well as another piconet enabled cordless telephone base unit 100b. The piconet devices 100b, 120, 122 and 124 all communicate with one another using a compatible piconet technique, e.g., using Bluetooth protocols.

The first wireless piconet 150 and the second wireless piconet 160 can be physically separated in excess of that allowed by a single wireless piconet, e.g., by over 10 meters (or over 100 meters if conventional scatternet extensions are used).

In accordance with the principles of the present invention, a cordless telephone (e.g., a digital cordless telephone) includes conventional components allowing cordless telephone operation including an RF front end, e.g., a 900 MHz or 2.4 GHz range front end, as well as a piconet RF front end to allow piconet wireless network communications.

For instance, as shown in FIG. 1, a base unit 100a of a first cordless telephone includes a suitable wireless range front end to allow it to communicate with another cordless telephone base unit 100b, as well as a suitable piconet front end and protocol (e.g., Bluetooth) to allow it to become a member of the relevant first piconet wireless network 150. In the embodiment shown in FIG. 1, the mating remote handset 102a to the first base unit 100a allows otherwise conventional cordless telephone operation of the base unit 100a at appropriate times. Similarly, a second base unit 100b of a second cordless telephone includes a suitable RF front end to allow cordless telephone communications with the other base unit 100a, as well as a suitable piconet front end and protocol to allow it to become a member of the relevant second piconet wireless network 160.

The base units 100a, 100b of the respective cordless telephones function as a bridge between the two separate wireless piconet networks 150, 160. Once the respective base units 100a, 100b reside in range of their respective short-range piconet 150, 160, they can communicate with all other members of the relevant defined piconet, e.g., computers, cellular telephones, printers, televisions, personal data assistants (PDAs), etc.

Figure 2:
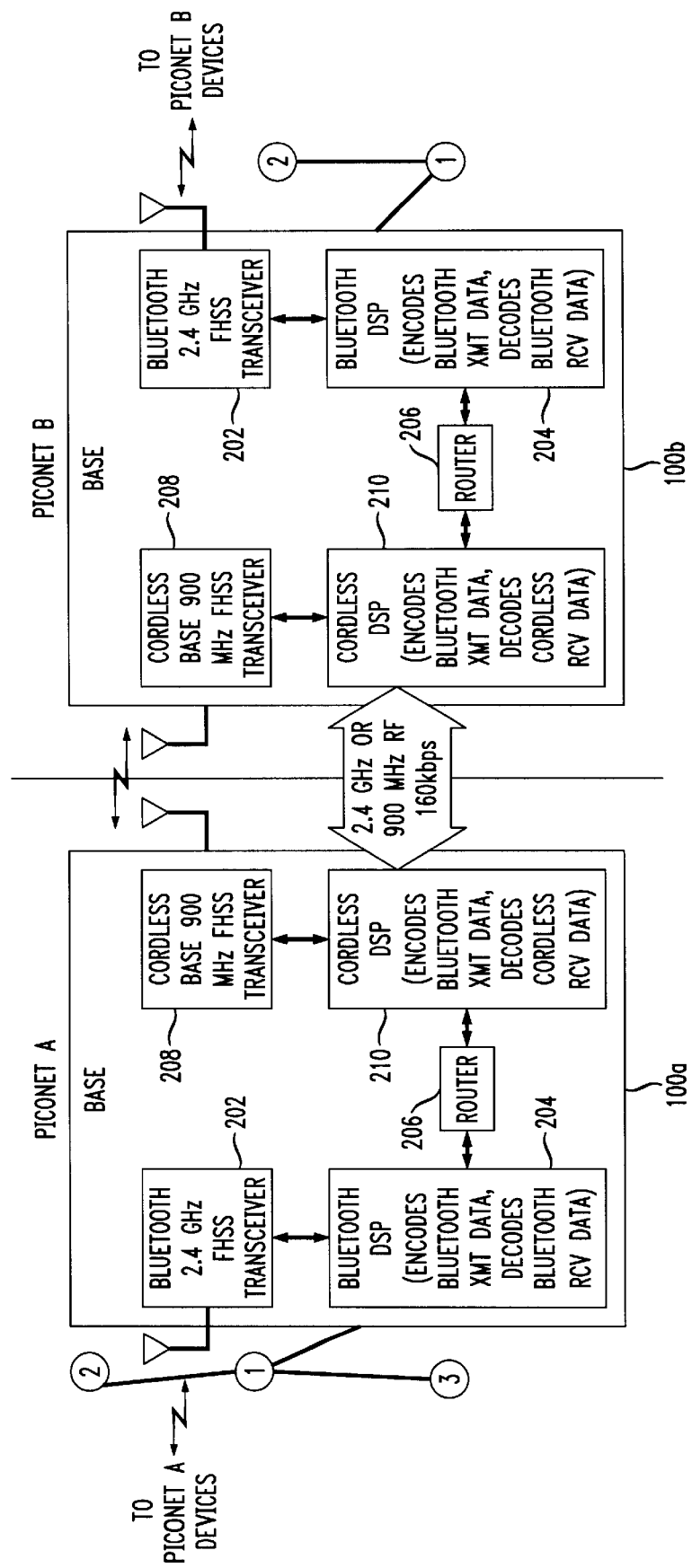
FIG. 2 shows a more detailed block diagram of the cordless telephone base units shown in FIG. 1 providing a long range wireless extension (i.e., a long distance cordless connection) between two separate wireless piconet networks, in accordance with the principles of the present invention.

FIG. 2 shows a more detailed block diagram of exemplary cordless telephone base units 100a, 100b shown in FIG. 1 providing a long range wireless extension (i.e., a long distance cordless scatternet connection) between two separate wireless piconet networks, in accordance with the principles of the present invention.

In particular, in FIG. 2, each cordless telephone base unit 100a, 100b includes two radio units residing within. First, there is the otherwise conventional cordless telephone frequency range hopping radio 208 that allows for normal FCC approved RF communications. However, in accordance with the principles of the present invention, the base units 100a, 100b each additionally include a 2.4 GHz frequency hopping wireless piconet (e.g., Bluetooth) radio 202.

The long range cordless telephone transceiver radio 208 is used for long distance communications between base units 100a, 100b. In an otherwise conventional cordless telephone mode, the cordless telephone base units 100a, 100b communicate with their respective remote handsets 102a, 102b using the long range cordless telephone transceiver radio 208.

In the disclosed embodiment, the two cordless telephone base units 100a, 100b simulate scatternet messaging between the respective piconet networks 150, 160 by transmitting piconet content information between the respective long range cordless telephone transceiver radios 208. Passage of data between the long range transceiver radios 208 and the respective wireless piconet (e.g., Bluetooth) radios 202 allow for wireless, long-range (e.g., more than one mile) communications between two piconet devices residing in separate wireless piconet networks.

As shown in FIG. 2, each radio front end (cordless telephone and wireless piconet) has its own processor 204, 210 to perform data and control frame encoding and decoding (e.g., protocol conversion), as well as data passage to and from the serviced radio (202, 208, respectively) and directed between processors 204, 210. The processors 204, 210 may be any suitable processor, e.g., a microprocessor, microcontroller, or digital signal processor (DSP).

The wireless piconet (e.g., Bluetooth) baseband protocol is a combination of circuit and packet switching. In the disclosed embodiment, time slots in the cordless telephone communications can be reserved for use by synchronous packets. Each packet is transmitted in a different hop frequency. A packet nominally covers a single time slot, but can be extended to cover up to five slots.

Wireless piconet (e.g., Bluetooth) can also support an asynchronous data channel, up to three simultaneous synchronous voice channels, or a channel, which simultaneously supports asynchronous data and synchronous voice. Each voice channel supports 64 kb/s synchronous (voice) link. The asynchronous channel can support an asymmetric link of maximally 721 kb/s in either direction while permitting 57.6 kb/s in the return direction, or a 432.6 kb/s symmetric link.

Current cordless telephone technology (e.g., 900 MHz range) transfers data at, e.g., 160 kb/s in each direction. Thus, a signal router 206 is used between the wireless piconet (e.g., Bluetooth) and long range cordless telephone RF modules 204, 210. The signal router 206 accommodates the data rate difference between the wireless piconet and the long range cordless telephone modules 204, 210 in any suitable fashion.

For example, with a Request to Send (RTS) communication protocol, the data being transmitted from one wireless piconet to another can be buffered by the relevant signal router 206. Using this technique, an RTS would not be given permission to proceed if the buffer in the signal router 206 is full.

The buffer in the signal router 206 may be of any size. For instance, in the disclosed embodiment, if the buffer is 1-bit wide, the channel would be 160 kb/s. However, if a large buffer is used and the data comes in bursts, higher data rates can be accommodated.

Another technique would be to transmit only a subset of the piconet's packets. For example, the signal router 206 can send only voice packets at 64 kb/s to the long range cordless telephone transceiver radio 208.

Yet another technique would be to use multiple cordless radios 208 in parallel to increase bandwidth.

Another way to accommodate the data rate difference would be to remove forward error correction in the wireless cordless radio transmissions. For instance, less protection is possible because the data rate is reduced and motion is less likely, since the remote handset 102 would likely be placed (stationary) near the relevant piconet device. Since there is some flexibility in the exact location of the remote handset 102, the user could "fine tune" the position of the base unit 100 of the cordless telephone based on feedback displayed on a display, e.g., on an LCD display, or output as audible tones, thus allowing achievement of an optimal connection and therefore less data loss.

One last possibility is to use a dynamic frame size to provide additional bandwidth in the direction with the most need. For example, when surfing the world wide web, the required bandwidth for outgoing data is typically far less then that of incoming data, since most outgoing data merely contains the requests for web pages (e.g., an activated hyperlink). On the other hand, the requested data related to the selected web page being received typically contains much more date. For this example then, the frame size of the communication in one direction between the two base units 100a, 100b is much larger than the frame size of the communication in return.

Figure 3:
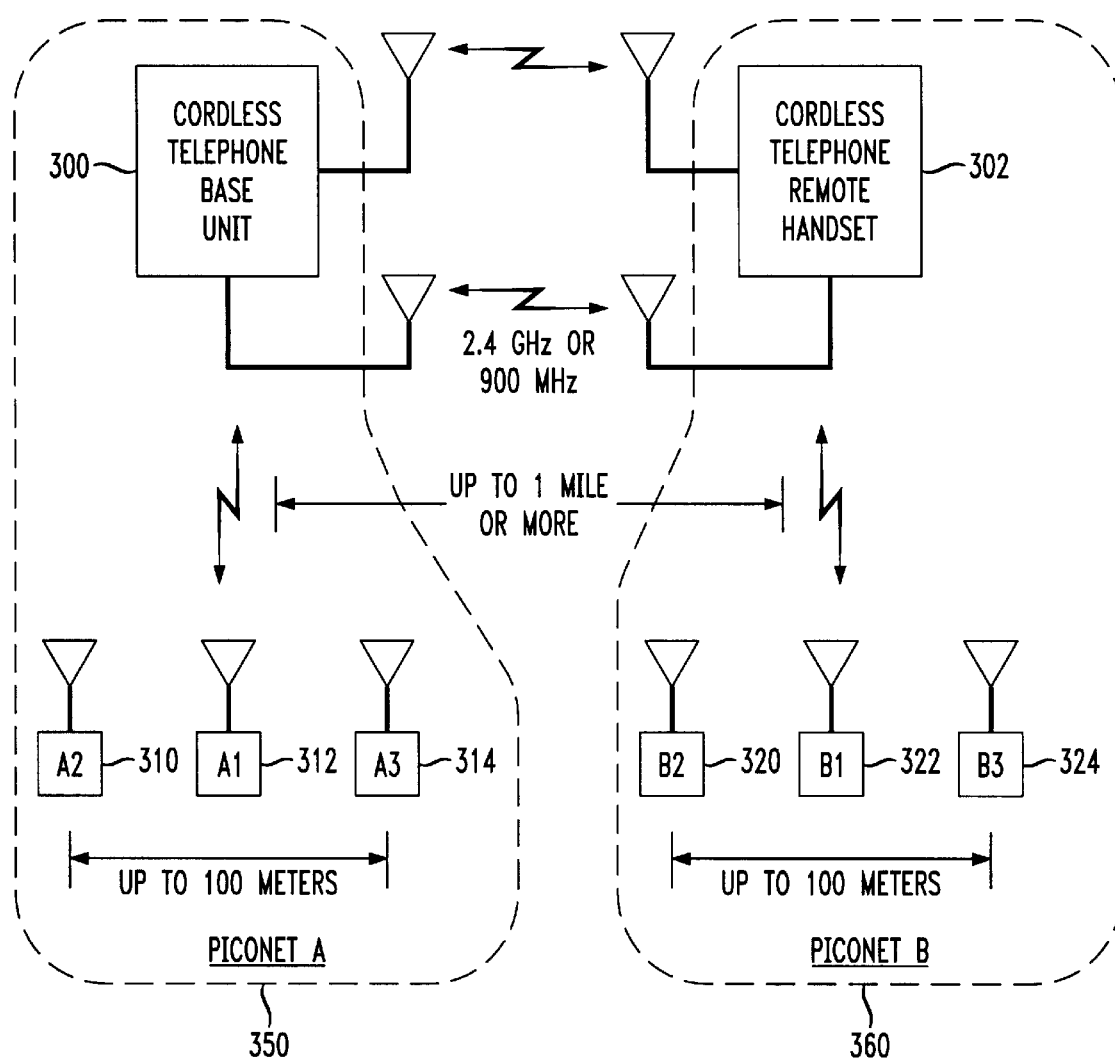
FIG. 3 shows a block diagram of another embodiment including the implementation of a cordless telephone base unit in a first wireless piconet network and a matching cordless telephone remote handset in a second wireless piconet network, and the communication of piconet content information from one piconet network to another over a wireless channel between the base unit and remote handset of the cordless telephone, in accordance with the principles of the present invention.
Figure 4:
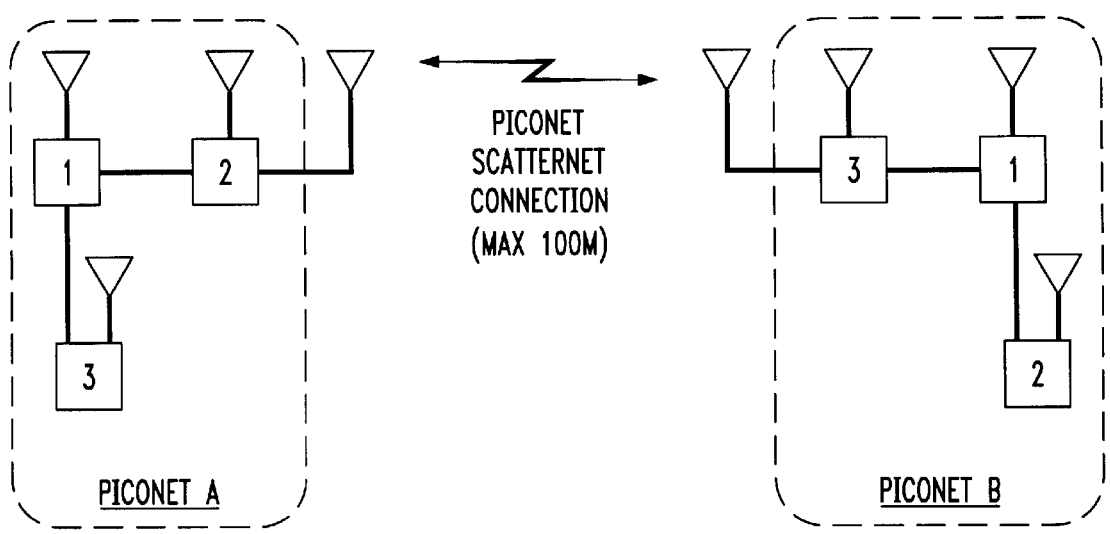
FIG. 4 is a block diagram of the implementation of a wireless scatternet to extend the range between two separate wireless piconet networks.

FIG. 3 shows a block diagram of another embodiment including the implementation of a cordless telephone base unit in a first wireless piconet network and a matching cordless telephone remote handset in a second wireless piconet network, and the communication of piconet content information from one piconet network to another over a long range wireless channel between the base unit and remote handset of the cordless telephone, in accordance with the principles of the present invention.

In particular, in FIG. 3, instead of base unit 100a to base unit 100b communications as shown in FIGS. 1 and 2, the same methodology is implemented in using long range cordless telephone communication technology between a base unit 300 and its mating remote handset 302. The base unit 300 is placed as an active member of a first wireless piconet network 350, while its remote handset 302 is placed as an active member of a second wireless piconet network 360. Thus, the base unit 300 and mating remote handset 302 of a single cordless telephone provide a wireless, long-range (e.g., 1 mile or more) bridge between two separate wireless piconet networks 350, 360.

FIG. 3 illustrates how remote handset 302 to/from base unit 300 communications extend a scatternet connection. This is beneficial from a consumer's viewpoint since one would only need to purchase a single (Bluetooth enabled) cordless telephone. An additional benefit is that the remote handset 302 becomes a mobile extension useful, e.g., for taking a networked laptop out into the backyard. This provides a shorter-term scatternet connection, particularly since the remote handset 302 must periodically be returned to the base unit 300 for re-charge, although an external power charge source other than from the base unit 300 would allow indefinite operation of the remote handset 302 remote from its base unit 300.

In these situations it should be noted that even though the remote handset is being used, the telephone line would not necessarily be used. For instance, in another embodiment, the remote handset 302 as described herein need not function as a remote handset 302 of a cordless telephone. Rather, a wireless piconet (e.g., Bluetooth) enabled cordless telephone might be provided having a base unit 300, remote handset 302, and computer module (PC Card) where the computer module would access the base unit 300 without the need of the remote handset 302.

The primary limitation of wireless piconets is the short-range links required. It is both desirable and conceivable for links greater than 100 meters. Thus, in accordance with the principles of the present invention, cordless telephones can use FCC approved transmit levels to obtain piconet communication links of approximately 1 mile. The present invention combines cordless telephone long-range communications with universal short-range piconet devices, allowing cordless telephones to make scatternet connections. As a result, a first wireless piconet network (and all its connected wireless devices) can communicate with all other wireless devices found in a second wireless piconet network at a range far exceeding the inherent 100 meter limitation.

In this and other embodiments, the remote handset 302 of the cordless telephone may be used to control multiple devices communicating over the relevant wireless piconet networks 350, 360, either through DTMF key sequences or through voice commands using a suitable voice recognition module.

Another use of cordless telephone technology including a wireless piconet (e.g., Bluetooth) or other piconet wireless network radio is to include a modem in the base unit, and allow any wireless piconet (e.g., Bluetooth) enabled device to access the modem. For example, by placing the remote handset next to a laptop computer, the remote handset would communicate with the laptop computer using a wireless piconet (e.g., Bluetooth) protocol. The remote handset would then connect to the base unit using a long range cordless telephone RF connection. The base unit would connect using the telephone line to another computer or an Internet Service Provider.

In this way, a home would need only one modem (or one modem per line) regardless of the number of computers or other devices it may have. Alternatively, as connectivity advances, the home would need only one data subscriber link (DSL) or ISDN modem, and any device would establish a cordless connection to the modem.

In general, increased range for wireless piconet (e.g., Bluetooth) communications open the possibilities to numerous applications. For instance, the extended range of a wireless piconet using a cordless range extension allows range extensions to more than the conventional 100 meter range limit, allowing longer distance support for printers, network services, Internet access, etc. The present invention reduces or eliminates the need for a high power amp to extend range, while maintaining cordless telephone functionality.

While the described embodiments relate to the implementation of a piconet RF front end in a digital cordless telephone, the principles relate equally to implementation in an analog cordless telephone including appropriate modems at either end. Of course, digital cordless telephones provide much greater range and already include data transmission element making it preferred over implementation in an analog cordless telephone.

The use of cordless telephone technology also provides increased security for the wireless piconet communications. For instance, encryption technology can be utilized to provide higher security for long range communications between separate wireless piconets.

While the invention has been described with reference to the exemplary embodiments thereof, those skilled in the art will be able to make various modifications to the described embodiments of the invention without departing from the true spirit and scope of the invention.

What is claimed is:

1. An RF cordless telephone range extender for a piconet, comprising:
    a cordless telephone including a cordless telephone RF front end and a piconet wireless network RF front end; and
    a rate adapter to adapt a data rate of piconet information from said piconet to a data rate of said cordless telephone;
    wherein piconet content information flowing on a piconet wireless network is transmitted by said cordless telephone RF front end of said cordless telephone to another cordless telephone component, rate adapted back to said data rate of said piconet information, and passable to another piconet device, to effectively extend a communication range of said piconet wireless network.

2. The RF cordless telephone range extender for a piconet according to claim 1, wherein:
    said piconet content information transmitted by said cordless telephone is transmitted by said base unit of said cordless telephone to a remote handset of said cordless telephone.

3. The RF cordless telephone range extender for a piconet according to claim 2, wherein:
    said base unit is a member of a first piconet wireless network; and
    said remote handset is a member of a second piconet wireless network separate from said first piconet wireless network.

4. The RF cordless telephone range extender for a piconet according to claim 2, further comprising:
    a piconet device in communication with said cordless telephone.

5. The RF cordless telephone range extender for a piconet according to claim 1, wherein:
    said piconet content information transmitted by said cordless telephone is transmitted by said base unit of said cordless telephone to a base unit having a cordless telephone RF front end and a piconet wireless network RF front end of a second cordless telephone.

6. The RF cordless telephone range extender for a piconet according to claim 5, wherein:
    said base unit of said cordless telephone is a member of a first piconet wireless network; and
    said base unit of said second cordless telephone is a member of a second piconet wireless network separate from said first piconet wireless network.

7. The RF cordless telephone range extender for a piconet according to claim 1, wherein:
    said piconet utilizes a Bluetooth protocol.

8. The RF cordless telephone range extender for a piconet according to claim 1, wherein:
    said piconet utilizes a HomeRF protocol.

9. The RF cordless telephone range extended for a piconet according to claim 1, wherein:
    information from a remote handset of said cordless telephone being used to remotely control a device within said piconet wireless network.

10. In a cordless telephone, the improvement comprising:
    a piconet RF front end in a base unit of said cordless telephone; and
    a rate adapter to adapt a data rate of piconet information between a data rate of a piconet network to a data rate of said cordless telephone;
    wherein piconet content information indicating a destination piconet device received by said piconet RF front end of said cordless telephone relating to a first wireless piconet is transmitted over a cordless telephone RF front end of said base unit of said cordless telephone to a second wireless piconet separate from said first wireless piconet, and rate adapted back to said data rate of said piconet information, and passable to another piconet, to effectively extend a communication range of a piconet wireless network.

11. In the cordless telephone according to claim 10, wherein:
    said piconet content information transmitted over said cordless telephone RF front end is transmitted by said base unit of said cordless telephone to a remote handset of said cordless telephone.

12. In the cordless telephone according to claim 11, wherein:
    said base unit is a member of a first piconet wireless network; and
    said remote handset is a member of a second piconet wireless network separate from said first piconet wireless network.

13. In the cordless telephone according to claim 11, further comprising:
    a piconet device in communication with said cordless telephone.

14. In the cordless telephone according to claim 11, wherein:
    said piconet content information transmitted over said cordless telephone RF front end is transmitted by said base unit of said cordless telephone to a base unit having a cordless telephone RF front end and a piconet wireless network RF front end of a second cordless telephone.

15. In the cordless telephone according to claim 14, wherein:
said base unit of said cordless telephone is a member of a first piconet wireless network; and
said base unit of said second cordless telephone is a member of a second piconet wireless network separate from said first piconet wireless network.

16. In the cordless telephone according to claim 11, wherein:
said piconet utilizes a Bluetooth protocol.

17. In the cordless telephone according to claim 11, wherein:
said piconet utilizes a HomeRF protocol.

18. A method of simulating scatternet functionality with a cordless telephone, comprising:
implementing a piconet front end in a cordless telephone;
adapting a data rate of piconet information passed in a piconet network including said cordless telephone to a data rate of said cordless telephone; and
passing piconet network information across a cordless telephone wireless channel established by said cordless telephone to another cordless telephone component for rate adaption back to said data rate of said piconet information, to effectively extend a communication range of said piconet network.

19. The method of simulating scatternet functionality with a cordless telephone according to claim 18, wherein:
said piconet front end includes a Bluetooth compliant protocol.

20. The method of simulating scatternet functionality with a cordless telephone according to claim 18, wherein:
said piconet front end includes a HomeRF compliant protocol.

21. The method of simulating scatternet functionality with a cordless telephone according to claim 18, further comprising:
another piconet front end is implemented in a remote handset of said cordless telephone.

22. Apparatus for simulating scatternet functionality with a cordless telephone, comprising:
piconet front end means in a cordless telephone;
rate adaption means for adapting a data rate of piconet information between a data rate of a piconet network to a data rate of said cordless telephone; and
means for passing piconet network information across a cordless telephone wireless channel established by said cordless telephone to another cordless telephone for rate adaption to a data rate of another piconet device, to effectively extend a communication range of said piconet network.

23. The apparatus for simulating scatternet functionality with a cordless telephone according to claim 22, wherein:
said piconet front end includes a Bluetooth compliant protocol.

24. The apparatus for simulating scatternet functionality with a cordless telephone according to claim 22, wherein:
said piconet front end includes a HomeRF compliant protocol.

25. The apparatus for simulating scatternet functionality with a cordless telephone according to claim 22, further comprising:
additional piconet front end means implemented in a remote handset of said cordless telephone.

26. The apparatus for simulating scatternet functionality with a cordless telephone according to claim 22, further comprising:
additional piconet front end means implemented in a base unit of another cordless telephone.

27. A method of routing wireless piconet information over a long range wireless communication device, comprising:
routing piconet information indicating a destination piconet device from a first wireless piconet to a long range wireless communication device having a cordless telephone RF front end and a piconet wireless network RF front end;
adapting a data rate of said piconet information to a data rate of said long range wireless communication device;
transmitting said piconet information over said long range wireless communication device to a mating long range wireless communication device having a cordless telephone RF front end and a piconet wireless network RF front end; and
routing said received piconet information from said mating long range wireless communication device to a second wireless piconet distinct from said first wireless piconet;
wherein said long range wireless communication device and said mating long range wireless communication device transmit over distances greater than a piconet device.

28. The method of routing wireless piconet information over a long range wireless communication device according to claim 27, wherein:
said wireless piconet information conforms to a Bluetooth protocol.

29. The method of routing wireless piconet information over a long range wireless communication device according to claim 27, wherein:
said long range wireless communication device is a base unit of a cordless telephone.

* * * * *